United States Patent Office 2,739,158
Patented Mar. 20, 1956

2,739,158
PREPARATION OF β-LACTONES

John R. Caldwell, Kingsport, Tenn., assignor to Eastman Kodak Company, Rochester, N. Y., a corporation of New Jersey No Drawing. Application October 19, 1951,
Serial No. 252,196

9 Claims. (Cl. 260—343.9)

This invention relates to a process for preparing β-lactones, i. e. lactones of β-hydroxy carboxylic acids. More particularly, this invention relates to a process for preparing lactones of β-hydroxy carboxylic acids which comprises reacting a ketene with a carbonyl-containing compound such as an aldehyde, ketone, diketone, or keto-ester in the presence of a novel catalyst, zinc trifluoroacetate.

Staudinger first indicated that keto-ketenes, such as diphenyl ketene, react with aldehydes and ketones to give lactones, (Annalen 384, 1911, pages 38 to 135, and Annalen 380, 1911, page 243) and with unsaturated ketones, to give unsaturated hydrocarbons (Annalen 401, 1913, page 263). It has long been known that aldo-ketenes, such as methyl ketene, readily polymerize to the dimer under ordinary conditions of temperature and pressure. Boese in U. S. Patent No. 2,108,427, issued February 15, 1939, shows that ketene dimers react with aldehydes to produce unsaturated ketones. The process of my invention, however, is applicable both to aldo- and keto-ketenes although ketene itself is usually preferred.

Kung in U. S. Patent No. 2,356,459, issued August 22, 1944, shows the reaction between ketenes and aldehydes and ketones to produce β-lactones, a catalyst of the Friedel-Crafts type being employed.

I have now found that when a ketone is reacted with an aldehyde, ketone, diketone, or keto-ester, hereinafter referred to as a carbonyl-containing compound in the presence of a catalytic amount of zinc trifluoroacetate, β-lactones are attained in increased yields and without the formation of the product-catalyst complexes which are produced when the Friedel-Crafts type catalysts of the prior art are used.

It is, therefore, an object of my invention to provide a new catalyst, zinc trifluoroacetate, for the reaction between a ketene and a carbonyl-containing compound whereby undesirable catalysts complexes are not formed.

Another object of this invention is to provide a process for preparing β-lactones in yields of 75–85%.

In accordance with my invention these and other objects are attained by reacting ketene with a carbonyl-containing compound in the presence of a catalytic amount of zinc trifluoroacetate. The reaction may be represented by the following general equation:

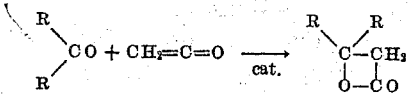

Aldehydes which may be employed in my invention have the formula:

wherein R represents a hydrogen atom, an alkyl radical such as methyl, ethyl, propyl, butyl, secondary butyl and tertiary butyl radicals, i. e. an alkyl group of the formula $C_nH_{2n+1}$ wherein $n$ is a positive integer of 1 to 4; an aralkyl radical, such as benzyl or β-phenyl ethyl; and an aryl group such as phenyl, ortho-, meta-, and para-tolyl, i. e. an aryl radical of the benzene series having 6 to 10 carbon atoms. Aldehydes of the formula wherein R is a hydrogen atom or a methyl group are preferred for the purpose of my invention. However, other aldehydes may likewise be employed including those containing ester or ether linkages. Suitable aldehydes includes formaldehyde, acetaldehyde, propionaldehyde, isobutyraldehyde, butyraldehyde, hexaldehyde, furfural, benzaldehyde, vanillin and crotonaldehyde.

Ketones which may be employed in my process have the formula:

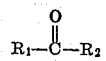

wherein $R_1$ and $R_2$ represent the same or different alkyl groups, such as methyl, ethyl, propyl, butyl, secondary and tertiary butyl, i. e. an alkyl radical having the formula $C_nH_{2n+1}$, where $n$ is a positive integer from 1 to 4, an aryl group such as phenyl, ortho-, meta-, and para-tolyl, i. e. an aryl group of the benzene series having 6 to 10 carbon atoms, or an aralkyl group, such as benzyl or β-phenyl ethyl. Ketones in which $R_1$ and $R_2$ represent alkenyl or cycloalkyl groups may also be employed. Substituted ketones such as levulinic acid, pyruvic acid, and acetonyl acetone may also be employed.

Acetone is the preferred ketone due to its commercial availability. However, other well known ketones may likewise be employed expeditiously.

The diketones which I prefer to use in my process have the formula:

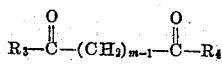

wherein $R_3$ and $R_4$ represent an alkyl radical such as methyl, ethyl, propyl, isopropyl, butyl, secondary and tertiary butyl, i. e. an alkyl radical of the formula $C_nH_{2n+1}$ wherein $n$ is a positive integer of 1 to 4, and $m$ represents a positive integer of 1 to 3. Diketones such as acetyl acetone, butanedione-2,3 and hexanedione-2,5 may be desirably employed.

Suitable keto-esters which may be used have the formula:

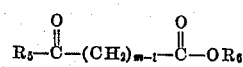

wherein $R_5$ and $R_6$ represent the same or different alkyl radicals, such as methyl, ethyl, propyl, isopropyl, butyl secondary and tertiary butyl, and $m$ is a positive integer of 1 to 3.

Ketenes which may be employed in my invention have the general formula:

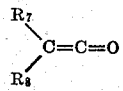

wherein $R_7$ and $R_8$ represent a hydrogen atom, the same or different alkyl radicals, such as methyl, ethyl, propyl, isopropyl, butyl, secondary and tertiary butyl, i. e. an alkyl radical having 1 to 4 carbon atoms, an aryl radical, such as phenyl, ortho-, meta-, and para-tolyl, i. e. an aryl radical of the benzene series having 6 to 10 carbon atoms or an aralkyl radical, such as benzyl, β-phenyl ethyl, and the like. Ketene where $R_7$ and $R_8$ are hydrogen atoms or a methyl radical represent a preferred group.

As previously stated, the catalyst employed in the process of this invention is zinc trifluoroacetate. It is made by reacting one mol of zinc oxide or zinc carbonate with two mols of trifluoroacetic acid in water solution. The salt is isolated by evaporating the water at 100° C. Zinc trifluoroacetate is readily soluble in the carbonyl-containing compounds used in the reaction. The catalyst may be advantageously employed in a concentration of 0.01% to 20% based on the weight of carbonyl compound. For most purposes it is preferred to use about 0.1% to 0.5% zinc trifluoroacetate based on the carbonyl compound.

The method of carrying out the reaction and of isolating the lactone formed will depend upon the particular reactants employed and upon the properties of the lactone produced. In general, it is desirable to carry out the reaction under mild conditions because the lactones are relatively unstable. A diluent is often useful, as, for example, ethyl ether, dioxane, or isopropyl ether. In some cases it is convenient to carry out the reaction in a solution of the lactone made in a previous run. This latter procedure makes it unnecessary to remove solvent during the purification step.

The temperature employed in carrying out the reaction will depend upon the properties and reactivity of the carbonyl compound. For example, formaldehyde will react with ketene at a temperature ranging from +50° C. to below 0° C. In the case of acetone, best results are obtained at a temperature range of 5° C. to 40° C. In general, the carbonyl compounds will react in the temperature range of −20° C. to +50° C. and give satisfactory yields of β-lactones.

If desired, the lactone can be isolated as such by careful fractional distillation in vacuum. In some cases, it is more practicable to isolate the unsaturated carboxylic acid formed by hydrolyzing the lactone to the β-hydroxy acid and subsequently dehydrating to the unsaturated acid as represented by the reactions wherein R and R' may be hydrogen atoms or hydrocarbon radicals.

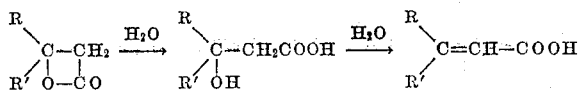

When an aldehyde is the carbonyl compound to be reacted, a more uniform process usually results if the ketene and aldehyde, in gaseous form and in substantially equimolar quantities, are passed into a stirred solution of zinc trifluoroacetate catalyst in the lactone, while in other cases the gaseous ketene may be passed into a stirred solution of the catalyst, carbonyl compound and lactone. However, it is not necessary always to employ a gaseous aldehyde or a liquid ketone, diketone, or keto ester. The temperature at which the condensation takes place is the critical factor to be considered and it is, therefore, to be understood that my process may be batchwise or continuous, or may be performed in the liquid or vapor phase. When a continuous process is employed, any of the conventional apparatus available to the art for such purposes may be employed. The catalyst may be supported on some inert solid carrier therefor, and the flow of reactants may be countercurrent or otherwise. I prefer, however, when using a continuous process to carry out my invention in the manner described in Hagemeyer Patent 2,469,690 of May 10, 1949. The pressures may be atmospheric or superatmospheric. If the ketene has been secured by the pyrolysis of acetic acid, it may be advantageous to carry out the process in a scrubber-type reactor. Such a process is described in H. G. Stone Patent 2,469,704 of May 10, 1949.

In some instances the β-lactone may be distilled directly from the neutralized reaction mixture. However, when the lactone of an olefinic-carbonyl compound has been prepared, ordinarily such a mode of separation cannot be realized even under diminished pressures, since decarboxylation of the formed lactone may follow. Hence an extraction or separation by gravity is indicated. When the lactone of a low boiling carbonyl compound, such as formaldehyde, acetaldehyde, etc. has been formed, the lactone may be separated by flash distillation, i. e. passing the warm reaction mixture into a heated chamber under reduced pressure, the low-boiling components thereof being distilled off, and a residue consisting primarily of the desired lactone remaining. The lactone may then be further purified by flash distillation under reduced pressures, or used without purification as a solvent for a subsequent condensation. This lactone solution need not correspond to the lactone being produced, however, for practical purposes it is preferred to use a lactone solution which corresponds to the lactone being formed. When desired, the lactone solvent and formed lactone need not correspond, if the lactone solution may be separated from the formed lactone by fractional distillation, or if the mixture of lactones is intended to be utilized without purification in the preparation of other compounds, such as synthetic resins, polymers, and the like.

The following examples further illustrate my invention:

*Example 1.—Preparation of β-propiolactone*

Gaseous ketene is prepared by the pyrolysis of acetone with an electrically heated Nichrome coil. Gaseous formaldehyde is made by heating a polymeric formaldehyde, such as paraformaldehyde, to a temperature of 140–160° C. The gaseous ketene and gaseous formaldehyde are then mixed in approximately equimolar ratios and are led into a stirred solution of 0.2 g. zinc trifluoroacetate in 70 cc. ethyl ether maintained at a temperature of 0° to 10° C. The passage of the gaseous reactants into the catalyst solution is continued until 1.0 gram mol of each reactant has been added. The reaction mixture is then stirred with 0.5 g. sodium carbonate in 5 cc. water to destroy the catalyst. The product is decanted from the catalyst precipitate and distilled to give a 75–80 per cent yield of β-propiolactone boiling at 37–40°/4 mm.

*Example 2.—Preparation of dimethyl acrylic acid*

Zinc trifluoroacetate (0.2 g.) is dissolved in 250 cc. acetone and ketene is passed into the solution at 20–25° C. with efficient stirring. After 1 mol of ketene has been absorbed, the reaction solution is mixed with 30 cc. water and 30 cc. concentrated HCl. The solution is distilled through a column. After most of the acetone and water have been removed, crystals of dimethyl acrylic acid begin to form in the condenser. The product is collected by extracting from the water solution with ether to give a yield of 80–90 per cent based on the ketene consumed. After recrystallizing from water, the dimethyl acrylic acid titrated to give an equivalent weight of 100.0; calculated equivalent weight 100.

*Example 3.—Preparation of β-lactone of 2-hydroxy-4-methyl valeric acid*

0.3 g. zinc trifluoroacetate are dissolved in 200 cc. freshly distilled isobutyraldehyde and 200 cc. isopropyl ether are added as a diluent. Ketene is passed into the solution at room temperature until 1 mol or 42 g. have been absorbed. The solution is stirred with 5 cc. of a saturated aqueous solution of sodium carbonate to precipitate the catalyst. The isopropyl ether is removed under reduced pressure and the residue is distilled in vacuum to give a yield of 85 per cent of the β-lactone of 2-hydroxy-4-methyl valeric acid. The lactone has the structure:

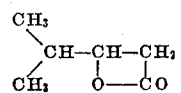

It boils at 110–113°/10 mm.

*Example 4.—Preparation of lactone of β-acetyl methyl-β-hydroxy butyric acid*

A solution of 0.3 g. zinc trifluoroacetate in 200 g. of acetyl acetone was stirred at 25–30° C. and ketene was passed into the solution until a total of 42 g. had been added. The catalyst was then precipitated by adding a mixture of 0.5 g. sodium carbonate in 1 cc. water and stirring for ten minutes. The unreacted acetyl acetone was removed in vacuum. The residue consisted of crude lactone of β-acetyl methyl-β-hydroxy butyric acid. It has the structure:

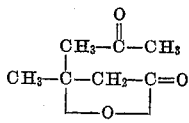

The lactone was pyrolyzed at 150–200° C. in vacuum to give $CO_2$ and a 30–40 per cent yield of 2-methyl-pentene-1-one-4, boiling at 127°/735 mm., $N_D^{20}$ 1.4412. In addition, a 15–20 per cent yield of diisopropenyl methane boiling at 88°/735 mm., $N_D^{20}$ 1.4399 was obtained. The latter product was produced by the decarboxylation of some di-β-lactone which was formed by the reaction of ketene with both ketone groups.

The β-lactones resulting from my invention are useful in preparing unsaturated carboxylic acids. They may also be used to prepare unsaturated esters, amides or nitriles.

What I claim and desire to secure by Letters Patent of the United States is:

1. A process for preparing a β-lactone which comprises reacting at a temperature of from —20° C. to 50° C. a ketene having the formula:

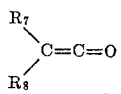

where $R_7$ and $R_8$ each represents a member selected from the group consisting of a hydrogen atom, a methyl group, an ethyl group and a phenyl ($C_6H_5$—) group, with a carbonyl compound selected from the group selected from the group consisting of:

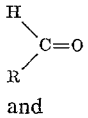      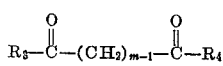

and

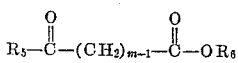

wherein R represents a member selected from the group consisting of a hydrogen atom; an alkyl group having the formula $C_nH_{2n+1}$ wherein $n$ is a positive integer from 1 to 4; a benzyl group; a β-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a β-phenylethyl group; and a phenyl ($C_6H_5$—) group, $R_3$, $R_4$, $R_5$ and $R_6$ each represents an alkyl group having the formula $C_nH_{2n+1}$ wherein $n$ is a positive integer from 1 to 4, and $m$ represents a positive integer from 1 to 3, in the presence of zinc trifluoroacetate.

2. A process for preparing a β-lactone which comprises reacting, at a temperature of from —20° C. to 50° C. ketene ($CH_2$=C=O) with acetone in the presence of from 0.01% to 2% by weight, based on the acetone used, of zinc trifluoroacetate.

3. A process for preparing β-propiolactone which comprises reacting at a temperature of from —20° C. to +50° C. ketene with formaldehyde in the presence of from 0.01% to 2% by weight based on the formaldehyde used of a catalyst consisting essentially of zinc trifluoroacetate.

4. A process for preparing β-propiolactone which comprises reacting ketene with formaldehyde in the presence of from 0.01% to 2% by weight based on the formaldehyde used of a catalyst consisting essentially of zinc trifluoroacetate, at a temperature of from —20° C. to +50° C. in the presence of an inert solvent.

5. A process for preparing β-propiolactone which comprises reacting ketene with formaldehyde in the presence of from 0.01% to 2% by weight based on the formaldehyde used of a catalyst consisting essentially of zinc trifluoroacetate at a temperature of from —20° C. to +50° C. in the presence of β-propiolactone as a solvent.

6. A process for preparing β-propiolactone which comprises forming a gaseous mixture of ketene and monomeric formaldehyde, and passing this gaseous mixture into a solution containing 0.01% to 2% by weight based on the amount of formaldehyde of zinc trifluoroacetate catalyst dissolved in β-propiolactone, and continuing the passage of the gaseous mixture of formaldehyde and ketene into the reaction mixture until a substantial portion of the formaldehyde is converted into β-propiolactone, while maintaining the temperature at from —20° C. to +50° C. during the reaction, thereafter neutralizing the catalyst with an aqueous solution of a weak base, and separating the formed lactone from the crude reaction mixture.

7. A process for preparing the β-lactone of 2-hydroxy-4-methyl valeric acid which comprises gaseous ketene ($CH_2$=C=O) with freshly distilled isobutyraldehyde containing 0.1% to 2% by weight based on the amount of aldehyde of zinc trifluoroacetate catalyst, and isopropyl ether as a diluent, and continuing the passage of the gaseous ketene into the reaction mixture until a substantial portion of the aldehyde is converted into said β-lactone, while maintaining the temperature at approximately 20° C. during the reaction, thereafter neutralizing the catalyst with an aqueous solution of sodium carbonate, and separating the thus formed lactone from the reaction mixture.

8. A process for preparing the lactone of β-acetyl methyl-β-hydroxy butyric acid which comprises passing gaseous ketene ($CH_2$=C=O) into a solution containing 0.1% to 2% zinc trifluoroacetate by weight in acetyl acetone during continuous stirring, continuing the operation until a substantial portion of the acetyl acetone is converted into said lactone while maintaining the temperature of the reaction mixture at 25° C. to 30° C. neutralizing the catalyst with an aqueous solution of sodium carbonate and separating unreacted acetyl acetone from the desired lactone by vacuum distillation.

9. A process for preparing dimethyl acrylic acid which comprises passing gaseous ketene ($CH_2$=C=O) in a solution containing 0.1% to 2% zinc trifluoroacetate by weight in acetone during stirring, continuing the operation until a substantial portion of the acetone is converted into said acid while maintaining the solution at a temperature of 20° C. to 25° C., adding aqueous HCl to the solution and distilling acetone and water from the solution and extracting crystals of dimethyl acrylic acid from the residue with ether.

References Cited in the file of this patent

UNITED STATES PATENTS 2,466,420    Hagemeyer, Jr., et al. _____ Apr. 5, 1949